G. B. KOHLER.
BOLT.
APPLICATION FILED MAY 31, 1913.
1,111,657.
Patented Sept. 22, 1914.
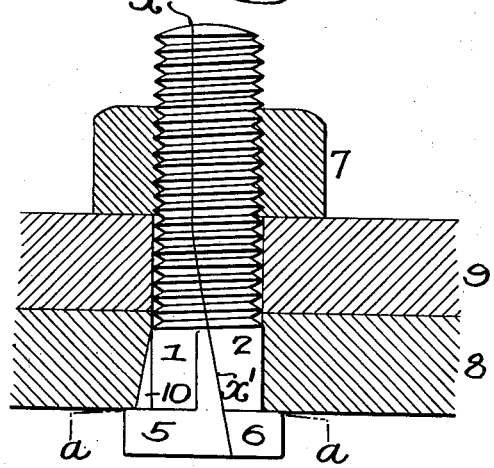
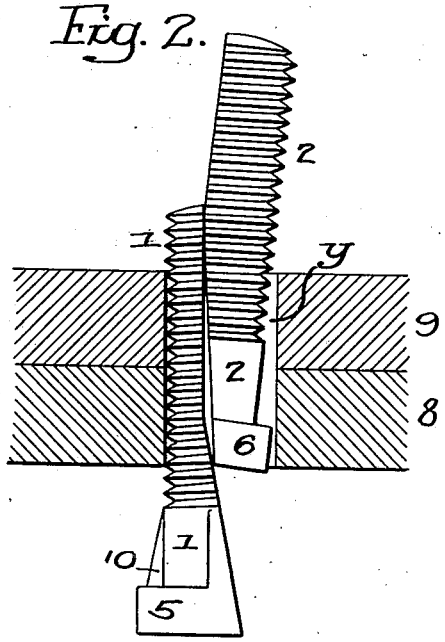
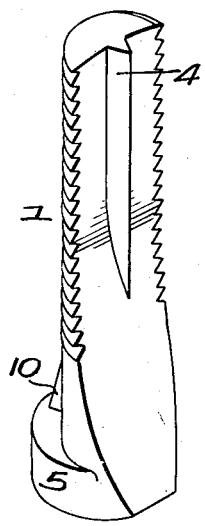
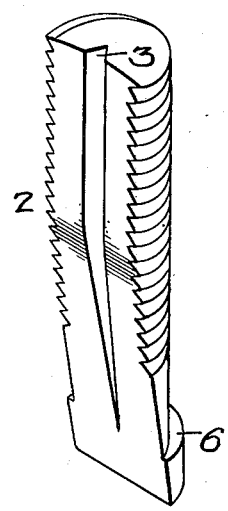
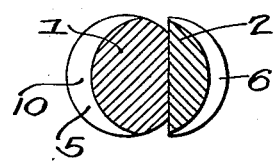
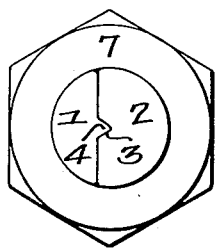
Witnesses—
Charles H. York
Willet Burrows
Inventor
George B. Kohler
by his Attorneys
Howson & Howson

UNITED STATES PATENT OFFICE.

GEORGE B. KOHLER, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

BOLT.

1,111,657.  Specification of Letters Patent.  Patented Sept. 22, 1914.

Application filed May 31, 1913. Serial No. 770,880.

*To all whom it may concern:*

Be it known that I, GEORGE B. KOHLER, a citizen of the United States, residing in Philadelphia, Pennsylvania, have invented certain Improvements in Bolts, of which the following is a specification.

The object of this invention is to provide a two-part bolt which can be passed through an opening of the same size as the bolt and, when the parts are in alinement, the heads thereon will overlap the walls of the openings so that, when a nut is applied, the bolt can be drawn tightly to attach two or more elements firmly together.

The invention is particularly adapted for use in blind openings, where it is impossible to insert a solid bolt from one side and to apply the nut from the opposite side, as, for instance, in partitions and other structural work.

In the accompanying drawing:—Figure 1, is a sectional view illustrating my improved bolt with the two parts in alinement and the nut applied; Fig. 2, is a sectional view showing the method of inserting the two parts of the bolt in the opening; Fig. 3, is a plan view; Fig. 4, is a sectional view on the line $a$—$a$, Fig. 1; and Figs. 5 and 6, are perspective views illustrating the two parts of the bolt.

Referring to the drawing, 1 and 2 are the two parts of the bolt; the parting line $x$, Fig. 1, being parallel with the sides of the bolt for a certain distance and then is at an angle, as at $x'$, Fig. 1. In the section 2 of the bolt is a V-shaped groove 3, in the present instance extending almost the entire length of the bolt and tapered to nothing at the head end.

4 is a V-shaped rib on the part 1, which extends into the groove in the part 3, keeping the two parts in alinement when one slides upon the other. On the part 1 is a head 5 and the head is of the same diameter as the hole $y$, Fig. 2, through which the bolt is passed, and is also of the same diameter as the threaded portion of the two parts of the bolts when they are assembled, as in Fig. 1. The head is set to one side of the center of the bolt, as illustrated in Fig. 4, so that when the bolt is in position, as in Fig. 1, it will overlap one side of the opening.

The head 6 of the part 2 is shaped as shown in Figs. 4 and 6, and is of a sufficient width to allow it to pass through the opening when the part 1 is in position, as in Fig. 2, and it projects sufficiently to allow it to overlap the wall of the opening when in place, as in Fig. 1.

The two parts are so designed that, when it is desired to insert the bolt in the opening, the part 1 is inserted part way into the opening, as in Fig. 2, and is held while the part 2 is inserted and, after the head passes the end of the opening, the two parts are moved so that the heads 5 and 6 come in contact with the surface of one of the elements to which the bolt is to be attached, the heads overlapping the edges of the opening. It will be noticed that when the bolt is in position it is substantially the same size as the opening. When the parts are in alinement, then the nut 7 is screwed onto the two parts, locking them together and clamping the elements 8 and 9, as indicated in Fig. 1. This construction makes an exceedingly simple and effective bolt and one which can be applied from one side of an opening.

In order to prevent the bolt from turning, I provide the part 1 with a fin 10 in the present instance, which, if the material in which the hole is made is of wood or other comparatively soft substance, will embed itself into the same, preventing the bolt from turning when the nut is applied. If the material in which the hole is made is of metal then a groove may be formed in the metal for the reception of the fin on the part 1, if desired.

The bolt can be of any length, depending upon the material through which it is to extend and can be used for any purpose where it is difficult or impossible to insert a solid bolt through one side and at the same time to secure the nut on the opposite side, and where the bolt is the same size as the opening.

I claim:—

1. A bolt made in two parts, each part having a head at one end and a screw threaded body portion, the parting line of the two sections of the bolt being to one side of the center line through the bolt and at the head portion being arranged at an incline to the center line so that one section can be passed through an opening having extended parallel walls in advance of the other section, both sections, when in place, snugly fitting the said opening; with a nut applied to the threaded portions of both sections.

2. The combination in a bolt made in two parts, each part having a head at one end with an abrupt shoulder, the body portion of each section being threaded, the body portion of one section being of a greater thickness than the other so as to bring the parting line at one side of the longitudinal center line of the bolt, the parting line at and near the head of the bolt being inclined so that the head of the thin section will be of a greater width than the head of the thick section, the parts being so proportioned that when one section is inserted in an opening having extended walls of even diameter throughout the body of the bolt will fill the opening and the heads will project beyond the opening; with a nut arranged to be applied to the threaded end of the bolt.

In testimony whereof, I have signed my name to this specification, in the presence of two subscribing witnesses.

GEORGE B. KOHLER.

Witnesses:
  HENRY C. ESLING,
  H. F. MCKILLIP.